United States Patent
Ono et al.

(10) Patent No.: US 11,909,346 B2
(45) Date of Patent: Feb. 20, 2024

(54) ELECTRIC MOTOR SYSTEM

(71) Applicant: DAIKIN INDUSTRIES, LTD., Osaka (JP)

(72) Inventors: Takaaki Ono, Osaka (JP); Yusuke Irino, Osaka (JP); Hiroshi Hibino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 114 days.

(21) Appl. No.: 17/484,829

(22) Filed: Sep. 24, 2021

(65) Prior Publication Data
US 2022/0014124 A1 Jan. 13, 2022

Related U.S. Application Data

(63) Continuation of application No. PCT/JP2020/012424, filed on Mar. 19, 2020.

(30) Foreign Application Priority Data

Mar. 27, 2019 (JP) ................. 2019-060834

(51) Int. Cl.
*H02P 5/51* (2016.01)
*F25B 31/02* (2006.01)

(52) U.S. Cl.
CPC .............. *H02P 5/51* (2016.02); *F25B 31/026* (2013.01)

(58) Field of Classification Search
CPC ........................................................ H02P 5/51
See application file for complete search history.

(56) References Cited

U.S. PATENT DOCUMENTS 5,549,172 A 8/1996 Mutoh et al.
8,616,016 B2 * 12/2013 Asano .................. F25B 49/025
62/238.7
2011/0141777 A1 * 6/2011 Sakakibara ......... H02M 5/4585
363/69

(Continued)

FOREIGN PATENT DOCUMENTS

CN 102263469 A 11/2011
EP 3 579 390 A1 12/2019

(Continued)

OTHER PUBLICATIONS

International Preliminary Report of corresponding PCT Application No. PCT/JP2020/012424 dated Oct. 7, 2021.

(Continued)

*Primary Examiner* — Kawing Chan
(74) *Attorney, Agent, or Firm* — Global IP Counselors, LLP

(57) ABSTRACT

An electric motor system includes a drive shaft, a first electric motor, a second electric motor, a first inverter, a second inverter and a control unit. The drive shaft is rotatable around an axis. The first electric motor and the second electric motor rotate the drive shaft. The first inverter supplies power in order to generate a torque to the first electric motor. The second inverter supplies power in order to generate a torque to the second electric motor. The control unit controls the first inverter and the second inverter. The controller is configured to be able to change a ratio between an output torque of the first electric motor and an output torque of the second electric motor.

7 Claims, 8 Drawing Sheets

(56) References Cited

U.S. PATENT DOCUMENTS

| | | | |
|---|---|---|---|
| 2015/0171774 A1 | 6/2015 | Kim et al. | |
| 2015/0303857 A1* | 10/2015 | Burke | H02K 11/33 |
| | | | 318/496 |
| 2020/0127586 A1* | 4/2020 | Chretien | H02K 47/20 |
| 2021/0050765 A1* | 2/2021 | Ono | F25B 1/053 |
| 2021/0108646 A1 | 4/2021 | Nakazawa et al. | |
| 2021/0115929 A1* | 4/2021 | Nakazawa | F04D 27/0261 |

FOREIGN PATENT DOCUMENTS

| | | | | |
|---|---|---|---|---|
| GB | 2472297 B | 4/2014 | | |
| JP | 7-15804 A | 1/1995 | | |
| JP | 8-322292 A | 12/1996 | | |
| JP | 2011-130525 A | 6/2011 | | |
| JP | 5852750 B2 * | 2/2016 | ........... | H02K 11/042 |
| JP | 2017-123759 A | 7/2017 | | |
| JP | 2018-191455 A | 11/2018 | | |
| KR | 20100134585 A * | 12/2010 | | |

OTHER PUBLICATIONS

International Search Report of corresponding PCT Application No. PCT/JP2020/012424 dated Jun. 16, 2020.
European Search Report of corresponding EP Application No. 20 77 6424.2 dated Oct. 19, 2022.

\* cited by examiner

ELECTRIC MOTOR SYSTEM

CROSS-REFERENCE TO RELATED APPLICATIONS

This is a continuation of International Application No. PCT/JP2020/012424 filed on Mar. 19, 2020, which claims priority to Japanese Patent Application No. 2019-060834, filed on Mar. 27, 2019. The entire disclosures of these applications are incorporated by reference herein.

BACKGROUND

Field of Invention

The present disclosure relates to an electric motor system.

Background Information

Japanese Unexamined Patent Application Publication No. 2018-191455 discloses an electric motor system including a drive shaft and a plurality of electric motors that rotate the drive shaft. In this electric motor system, the maximum value of a force generated by a predetermined electric motor is greater than the maximum value of a force generated by another predetermined electric motor.

SUMMARY

A first aspect of the present disclosure is directed to an electric motor system including a drive shaft, a first electric motor, a second electric motor, a first inverter, a second inverter and a control unit. The drive shaft is rotatable around an axis. The first electric motor and the second electric motor are configured to rotate the drive shaft. The first inverter is configured to supply power in order to generate a torque to the first electric motor. The second inverter is configured to supply power in order to generate a torque to the second electric motor. The control unit is configured to control the first inverter and the second inverter. The controller is configured to be able to change a ratio between an output torque of the first electric motor and an output torque of the second electric motor.

DETAILED DESCRIPTION OF EMBODIMENT(S)

First Embodiment

A first embodiment will be described. An electric motor system (2) according to the present embodiment is installed in a turbo compressor (1) that is disposed in a refrigerant circuit (not illustrated) and that compresses refrigerant. However, the electric motor system (2) according to the present embodiment may be put to other uses.

Configuration of Turbo Compressor

Figure 1:
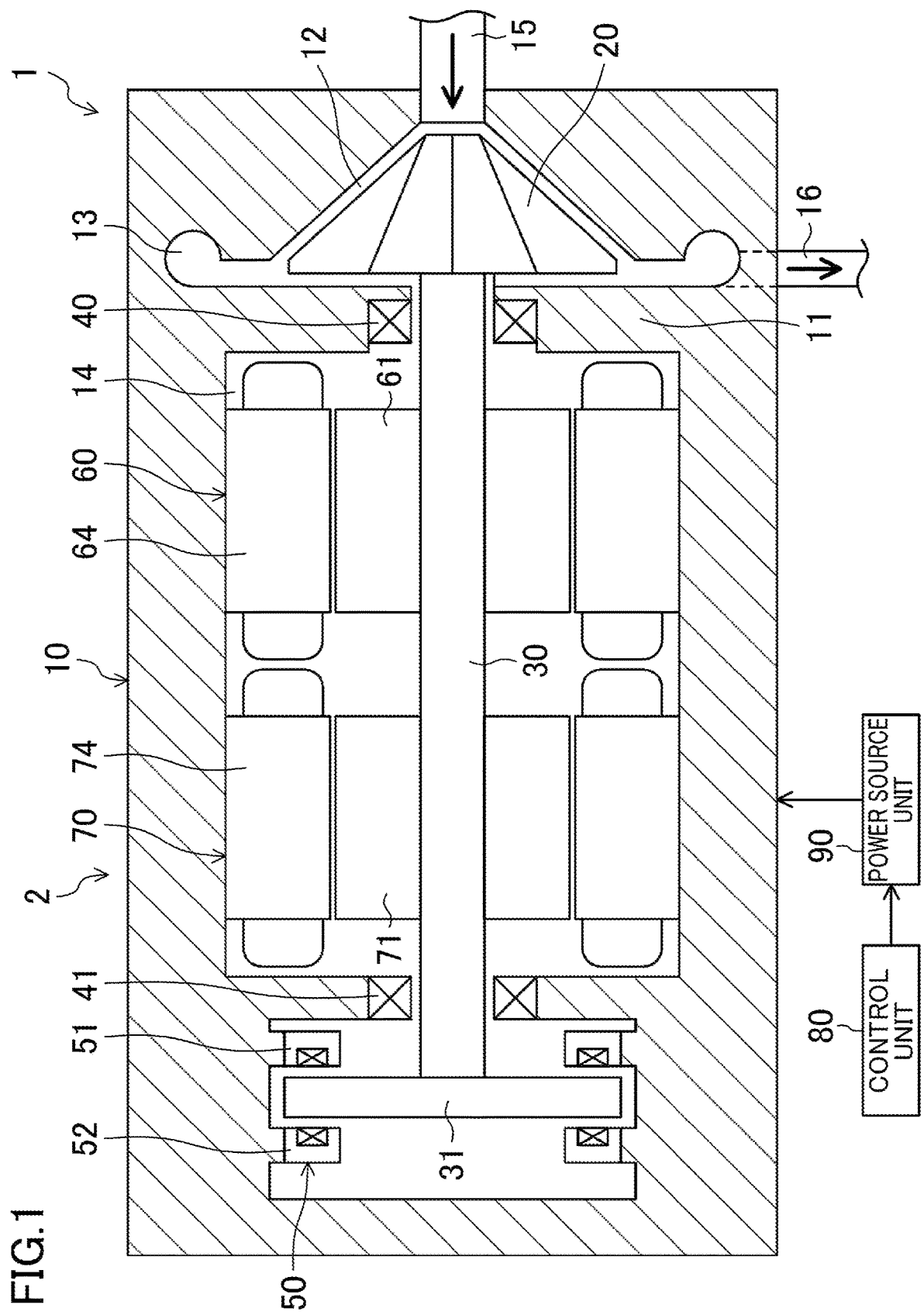
FIG. 1 is a longitudinal sectional view illustrating an example of a configuration of a turbo compressor according to a first embodiment.

As illustrated in FIG. 1, the turbo compressor (1) includes a casing (10), an impeller (20), and the electric motor system (2). The electric motor system (2) includes a drive shaft (30), touchdown bearings (40, 41), a thrust magnetic bearing (50), a control unit (80), a power source unit (90), a first bearingless motor (60), and a second bearingless motor (70). The first bearingless motor (60) and the second bearingless motor (70) are disposed next to each other in an axial direction of the drive shaft (30). The first bearingless motor (60) constitutes a first electric motor. The second bearingless motor (70) constitutes a second electric motor.

In description of this specification, the term "axial direction" refers to a direction of the axis of rotation, which is the direction of the axis of the drive shaft (30). The term "radial direction" refers to a direction perpendicular to the axial direction. The term "outer circumferential side" refers to a side farther from the axis of the drive shaft (30). The term "inner circumferential side" refers to a side closer to the axis of the drive shaft (30).

Casing

The casing (10) has a cylindrical shape having closed both ends and is disposed such that the cylindrical axis extends in the horizontal direction. A space inside the casing (10) is partitioned by a wall portion (11). A space on the right side of the wall portion (11) forms an impeller chamber (12) that accommodates the impeller (20). A space on the left side of the wall portion (11) forms an electric motor chamber (14) that accommodates the first bearingless motor (60) and the second bearingless motor (70). The drive shaft (30) that extends in the axial direction in the casing (10) couples the impeller (20) and the first and second bearingless motors (60, 70) to each other.

Impeller

The impeller (20) is constituted by a plurality of blades to have a substantially conical outer shape. The impeller (20) is accommodated in the impeller chamber (12) in a state of being fixed to one end of the drive shaft (30). A suction pipe (15) and a discharge pipe (16) are connected to the impeller chamber (12). The impeller chamber (12) has a compression space (13) at an outer circumferential portion thereof. The suction pipe (15) is provided to introduce refrigerant into the impeller chamber (12) from outside. The discharge pipe (16)

is provided to return high-pressure refrigerant obtained by compression in the impeller chamber (12) to the outside.

Touchdown Bearings

The turbo compressor (1) includes two touchdown bearings (40, 41). One touchdown bearing (40) is disposed near one end portion (right end portion in FIG. 1) of the drive shaft (30). The other touchdown bearing (41) is disposed near the other end portion of the drive shaft (30). These touchdown bearings (40, 41) are configured to support the drive shaft (30) when the first and second bearingless motors (60, 70) are not in conduction (that is, the drive shaft (30) is not levitated).

Thrust Magnetic Bearing

As illustrated in FIG. 1, the thrust magnetic bearing (50) includes a first electromagnet (51) and a second electromagnet (52). The thrust magnetic bearing (50) is configured to support, with an electromagnetic force, a disk-shaped portion (hereinafter, referred to as a disk portion (31)) provided at the other end portion (that is, an end portion opposite from the one end portion where the impeller (20) is fixed) of the drive shaft (30). By controlling currents that flow through the first electromagnet (51) and the second electromagnet (52), the thrust magnetic bearing (50) can control the position of a supported portion (the disk portion (31)) of the drive shaft (30) in a direction in which the first electromagnet (51) and the second electromagnet (52) face each other (that is, the axial direction or the left-right direction in FIG. 1).

Control Unit

Based on a detected value obtained by a gap sensor (not illustrated) capable of detecting a gap between the disk portion (31) and the thrust magnetic bearing (50), the control unit (80) outputs a voltage command value (thrust voltage command value) for controlling a voltage to be supplied to the thrust magnetic bearing (50) so that the drive shaft (30) is located at a desired position. Based on detected values obtained by gap sensors (not illustrated) capable of detecting gaps between a stator (64, 74) and a rotor (61, 71) of the first and second bearingless motors (60, 70) and target rotational speeds of the impeller (20) and the drive shaft (30), the control unit (80) outputs voltage command values (motor voltage command values) for controlling voltages to be supplied to the first and second bearingless motors (60, 70). For example, the control unit (80) can be constituted by one or a plurality of microcomputers (not illustrated) and a program for causing the microcomputers to operate. A configuration of the control unit (80) will be described in detail below.

The gap sensors need not be used in detection of the gaps between the stator (64, 74) and the rotor (61, 71). For example, the gaps may be detected based on inductances of driving coils (66a to 66c, 76a to 76c) and supporting coils (67a to 67c, 77a to 77c).

Power Source Unit

Based on the thrust voltage command value and the motor voltage command values (first and second rotation voltage command values (Vr1*, Vr2*) and first and second levitation voltage command values (Vf1*, Vf2*)) from the control unit (80), the power source unit (90) supplies voltages to the thrust magnetic bearing (50) and the first and second bearingless motors (60, 70). The power source unit (90) includes a PWM (Pulse Width Modulation) amplifier (not illustrated), a first rotation inverter (91) and a first levitation inverter (93) that correspond to the first bearingless motor (60), and a second rotation inverter (92) and a second levitation inverter (94) that correspond to the second bearingless motor (70) (see FIG. 4). For example, each of the inverters (91 to 94) can be a voltage-type inverter.

First Bearingless Motor

The first bearingless motor (60) is disposed on a side closer to the impeller (20) in the electric motor chamber (14). The first bearingless motor (60) is configured to rotate the drive shaft (30) with an electromagnetic force and to support a radial load of the drive shaft (30) in a non-contact manner. The first bearingless motor (60) includes a pair of the rotor (61) and the stator (64). The rotor (61) is fixed to the drive shaft (30). The stator (64) is fixed to an inner circumferential wall of the casing (10).

Figure 2:
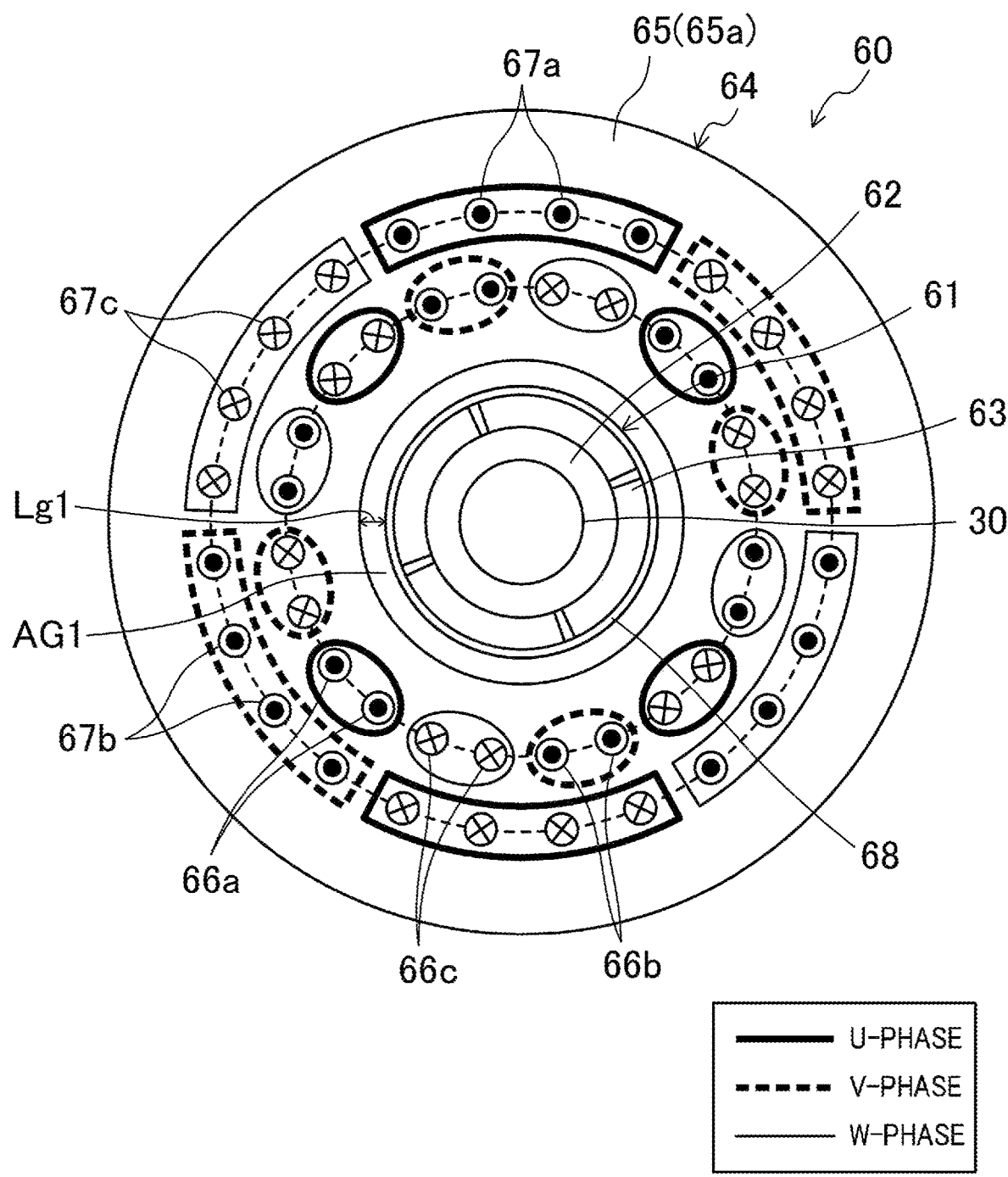
FIG. 2 is a cross sectional view illustrating an example of a configuration of a first bearingless motor.

As illustrated in FIG. 2, the first bearingless motor (60) is a surface-permanent-magnet-type bearingless motor. The stator (64) of the first bearingless motor (60) includes a stator core (65) including a back yoke portion (65a) and a plurality of teeth portions (not illustrated), and the driving coils (66a to 66c) and the supporting coils (67a to 67c) that are wound around the teeth portions. The rotor (61) of the first bearingless motor (60) includes a rotor core (62), a plurality of (four in this example) permanent magnets (63) disposed on an outer circumferential surface of the rotor core (62), and a protective member (68) surrounding the outer circumferences of the plurality of permanent magnets (63).

The stator core (65) of the stator (64) is made of a magnetic material (for example, a multilayer steel plate). The back yoke portion (65a) of the stator (64) has a cylindrical shape. The driving coils (66a to 66c) and the supporting coils (67a to 67c) are wound around the respective teeth portions in accordance with a distributed winding method. The driving coils (66a to 66c) and the supporting coils (67a to 67c) may be wound around the respective teeth portions in accordance with a concentrated winding method.

The driving coils (66a to 66c) are coils wound on the inner circumferential side of the teeth portions. The driving coils (66a to 66c) are constituted by U-phase driving coils (66a) each surrounded by a thick solid line in FIG. 2, V-phase driving coils (66b) each surrounded by a thick dashed line in FIG. 2, and W-phase driving coils (66c) each surrounded by a thin solid line in FIG. 2. The driving coils (66a to 66c) may be wound on an outer circumferential side of the teeth portions.

The supporting coils (67a to 67c) are coils wound on the outer circumferential side of the teeth portions. The supporting coils (67a to 67c) are constituted by U-phase supporting coils (67a) each surrounded by a thick solid line in FIG. 2, V-phase supporting coils (67b) each surrounded by a thick dashed line in FIG. 2, and W-phase supporting coils (67c) each surrounded by a thin solid line in FIG. 2. The supporting coils (67a to 67c) may be wound on the inner circumferential side of the teeth portions.

The rotor core (62) of the rotor (61) has a cylindrical shape. The rotor core (62) has, at a central portion thereof, a shaft hole through which the drive shaft (30) is inserted. The rotor core (62) is made of a magnetic material (for example, a multilayer steel plate). The four permanent magnets (63) each having a shape along the outer circumferential surface of the rotor core (62) are disposed along this outer circumferential surface with an angular pitch of 90° in a circumferential direction of the rotor (61). These four permanent magnets (63) have shapes identical to each other. The N-pole and the S-pole alternately appear in the circumferential direction of the rotor (61) on the outer circumferential surface side of the permanent magnets (63). The protective member (68) of the rotor (61) has a cylindrical shape and is disposed at the outer circumferences of the four permanent magnets (63). The number of poles of the rotor (61) illustrated in FIG. 2 is four but need not be four. The individual poles of the rotor (61) may be formed by a plurality of permanent magnets.

The teeth portions of the stator (64) and the rotor (61) have a first air gap (AG1) of a size Lg1 therebetween. The size of the first air gap (AG1) refers to a distance between the teeth portions of the stator (64) and a magnetic material portion of the rotor (61) in the radial direction. In the case where the protective member (68) of the rotor (61) is made of a non-magnetic material, the size of the first air gap (AG1) is a distance between the teeth portions of the stator (64) and the rotor core (62) of the rotor (61) in the radial direction. In the case where the protective member (68) of the rotor (61) is made of a magnetic material, the size of the first air gap (AG1) is a distance between the teeth portions of the stator (64) and the protective member (68) of the rotor (61) in the radial direction as illustrated in FIG. 2. The size of the first air gap (AG1) is substantially equal to Lg1 and thus substantially uniform all over the circumference. The size of the first air gap (AG1) may vary in the circumferential direction. In such a case, the average value of the size of the first air gap (AG1) all over the circumference is equal to Lg1.

Herein, the term "size" of an air gap (AG1, AG2) refers to a length of the air gap (AG1, AG2) in a direction in which the stator (64, 74) and the rotor (61, 71) of each bearingless motor (60, 70) face each other (that is, the radial direction of each bearingless motor (60, 70).

Second Bearingless Motor

The second bearingless motor (70) is disposed on a side far from the impeller (20) in the electric motor chamber (14). The second bearingless motor (70) is configured to rotate the drive shaft (30) with an electromagnetic force and to support the radial load of the drive shaft (30) in a non-contact manner. The second bearingless motor (70) includes a pair of the rotor (71) and the stator (74). The rotor (71) is fixed to the drive shaft (30). The stator (74) is fixed to the inner circumferential wall of the casing (10).

Figure 3:
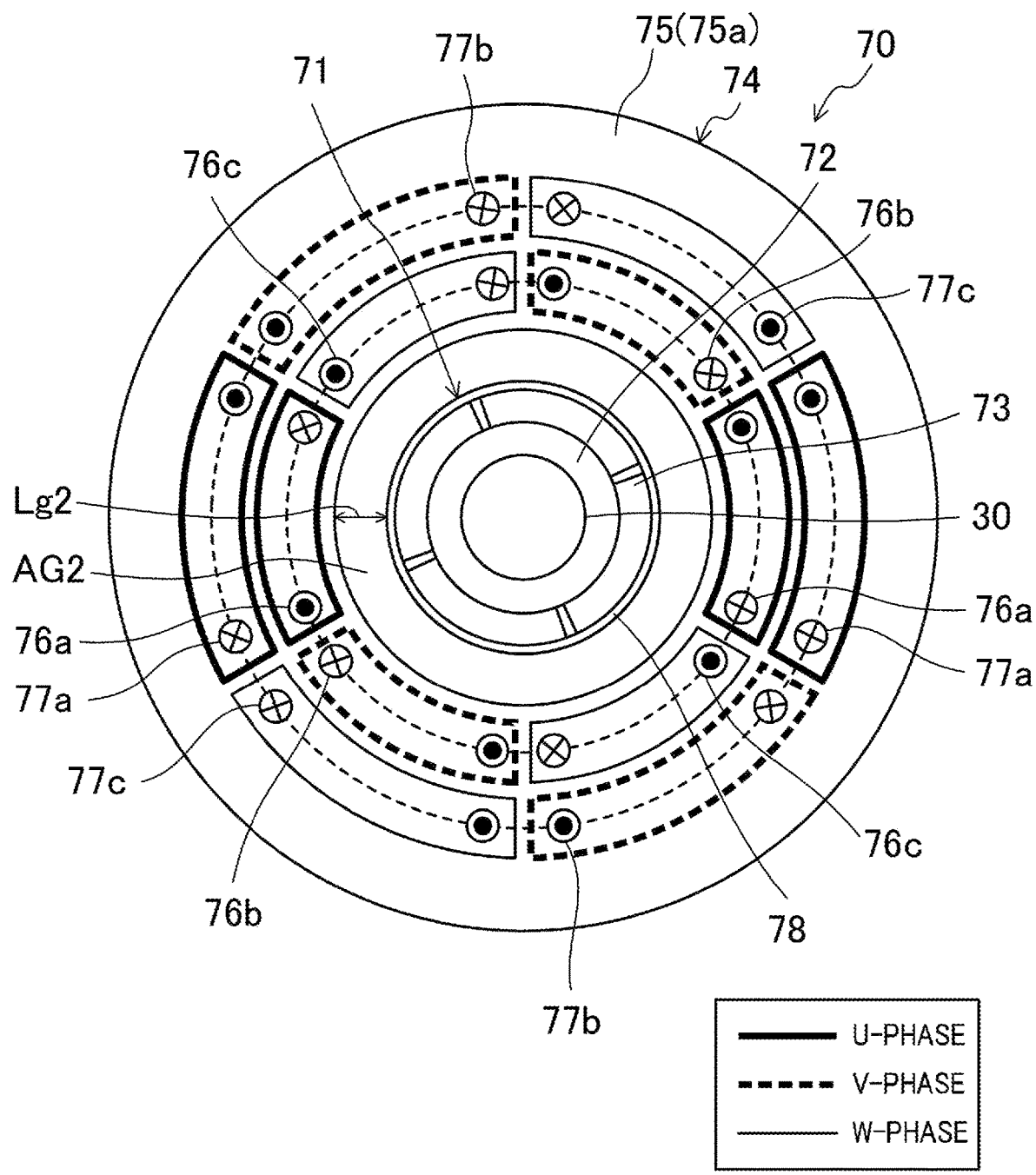
FIG. 3 is a cross sectional view illustrating an example of a configuration of a second bearingless motor.

As illustrated in FIG. 3, the second bearingless motor (70) is a surface-permanent-magnet-type bearingless motor. The stator (74) of the second bearingless motor (70) includes a stator core (75) including a back yoke portion (75a) and a plurality of teeth portions (not illustrated), and the driving coils (76a to 76c) and the supporting coils (77a to 77c) that are wound around the teeth portions. The rotor (71) of the second bearingless motor (70) includes a rotor core (72), a plurality of (four in this example) permanent magnets (73) disposed on an outer circumferential surface of the rotor core (72), and a protective member (78) surrounding the outer circumferences of the plurality of permanent magnets (73).

The stator core (75) of the stator (74) is made of a magnetic material (for example, a multilayer steel plate). The back yoke portion (75a) of the stator (74) has a cylindrical shape. The driving coils (76a to 76c) and the supporting coils (77a to 77c) are wound around the respective teeth portions in accordance with the concentrated winding method. The driving coils (76a to 76c) and the supporting coils (77a to 77c) may be wound around the respective teeth portions in accordance with the distributed winding method. The stator core (75) of the second bearingless motor (70) may have a shape (such as an outer diameter, an inner diameter, or the number of slots, for example) different from a shape of the stator core (65) of the first bearingless motor (60). The stator core (75) of the second bearingless motor (70) may be made of a material different from a material of the stator core (65) of the first bearingless motor (60).

The driving coils (76a to 76c) are coils wound on the inner circumferential side of the teeth portions. The driving coils (76a to 76c) are constituted by U-phase driving coils (76a) each surrounded by a thick solid line in FIG. 3, V-phase driving coils (76b) each surrounded by a thick dashed line in FIG. 3, and W-phase driving coils (76c) each surrounded by a thin solid line in FIG. 3. The driving coils (76a to 76c) may be wound on an outer circumferential side of the teeth portions. The driving coils (76a to 76c) of the second bearingless motor (70) may have the number of turns different from the number of turns of the driving coils (66a to 66c) of the first bearingless motor (60).

The supporting coils (77a to 77c) are coils wound on the outer circumferential side of the teeth portions. The supporting coils (77a to 77c) are constituted by U-phase supporting coils (77a) each surrounded by a thick solid line in FIG. 3, V-phase supporting coils (77b) each surrounded by a thick dashed line in FIG. 3, and W-phase supporting coils (77c) each surrounded by a thin solid line in FIG. 3. The supporting coils (77a to 77c) may be wound on the inner circumferential side of the teeth portions. The supporting coils (77a to 77c) of the second bearingless motor (70) may have the number of turns different from the number of turns of the supporting coils (67a to 67c) of the first bearingless motor (60).

The rotor core (72) of the rotor (71) has a cylindrical shape. The rotor core (72) has, at a central portion thereof, a shaft hole through which the drive shaft (30) is inserted. The rotor core (72) is made of a magnetic material (for example, a multilayer steel plate). The four permanent magnets (73) each having a shape along the outer circumferential surface of the rotor core (72) are disposed along this outer circumferential surface with an angular pitch of 90° in a circumferential direction of the rotor (71). These four permanent magnets (73) have shapes identical to each other. The N-pole and the S-pole alternately appear in the circumferential direction of the rotor (71) on the outer circumferential surface side of the permanent magnets (73). The protective member (78) of the rotor (71) has a cylindrical shape and is disposed at the outer circumferences of the four permanent magnets (73). The number of poles of the rotor (71) is four but need not be four. The rotor (71) of the second bearingless motor (70) may have the number of poles different from the number of poles of the rotor (61) of the first bearingless motor (60). The individual poles of the rotor (71) may be formed by the plurality of permanent magnets (73). The number of permanent magnets (73) that form the individual poles of the rotor (71) of the second bearingless motor (70) may be different from the number of permanent magnets (63) that form the individual poles of the rotor (61) of the first bearingless motor (60).

The teeth portions of the stator (74) and the rotor (71) have a second air gap (AG2) of a size Lg2 therebetween. The size of the second air gap (AG2) refers to a distance between the teeth portions of the stator (74) and a magnetic material portion of the rotor (71) in the radial direction. In the case where the protective member (78) of the rotor (71) is made of a non-magnetic material, the size of the second air gap (AG2) is a distance between the teeth portions of the stator (74) and the rotor core (72) of the rotor (71) in the radial direction. In the case where the protective member (78) of the rotor (71) is made of a magnetic material, the size of the second air gap (AG2) is a distance between the teeth portions of the stator (74) and the protective member (78) of the rotor (71) in the radial direction as illustrated in FIG. 3. The size of the second air gap (AG2) is substantially equal to Lg2 and thus substantially uniform all over the circumference. The size of the second air gap (AG2) may vary in the circumferential direction. In such a case, the average value of the size of the second air gap (AG2) all over the circumference is equal to Lg2.

As illustrated in FIGS. 2 and 3, the size Lg1 of the first air gap (AG1) of the first bearingless motor (60) and the size Lg2 of the second air gap (AG2) of the second bearingless motor (70) are different from each other. Specifically, the first air gap (AG1) is smaller than the second air gap (AG2).

Configuration of Electric Motor System

Figure 4:
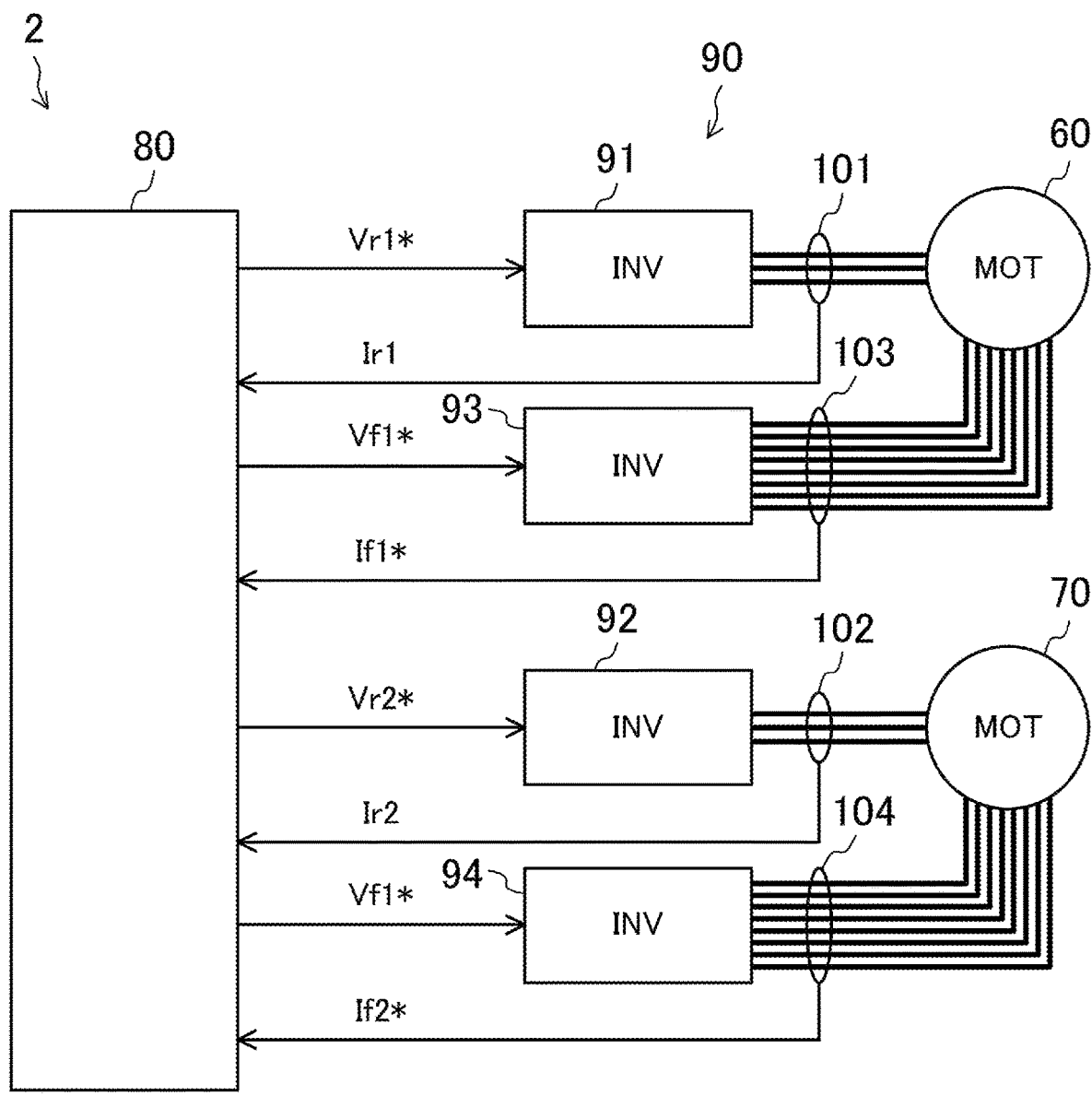
FIG. 4 is a block diagram illustrating an example of a configuration of an electric motor system according to the first embodiment.

As illustrated in FIG. 4, the electric motor system (2) includes the control unit (80), the first and second rotation inverters (91, 92), the first and second levitation inverters (93, 94), and the first and second bearingless motors (60, 70).

Each of the rotation inverters (91, 92) receives a corresponding one of rotation voltage command values (Vr1*, Vr2*) from the control unit (80) and supplies a voltage (or power) for rotation (or for generating a torque) to a corresponding one of the bearingless motors (60, 70). Each of the bearingless motors (60, 70) rotates the drive shaft (30) and the impeller (20) by using the voltage for rotation supplied thereto. A current that flows through an electric wire that electrically connects each of the rotation inverters (91, 92) and a corresponding one of the bearingless motors (60, 70) to each other is detected by a corresponding one of first and second rotation current sensors (101, 102). Detected values (first and second rotation current detected values (Ir1, Ir2)) obtained by the respective rotation current sensors (101, 102) are sent to the control unit (80). The first and second rotation current sensors (101, 102) constitute a current detection unit.

Each of the levitation inverters (93, 94) receives a corresponding one of levitation voltage command values (Vf1*, Vf2*) from the control unit (80) and supplies a voltage (or power) for levitation (or for supporting) to a corresponding one of the bearingless motors (60, 70). Each of the bearingless motors (60, 70) supports the drive shaft (30) in a non-contact manner by using the voltage for levitation supplied thereto. A current that flows through an electric wire that electrically connects each of the levitation inverters (93, 94) and a corresponding one of the bearingless motors (60, 70) to each other is detected by a corresponding one of first and second levitation current sensors (103, 104). Detected values (first and second levitation current detected values (If1, If2)) obtained by the respective levitation current sensors (103, 104) are sent to the control unit (80).

Control Unit

Figure 5:
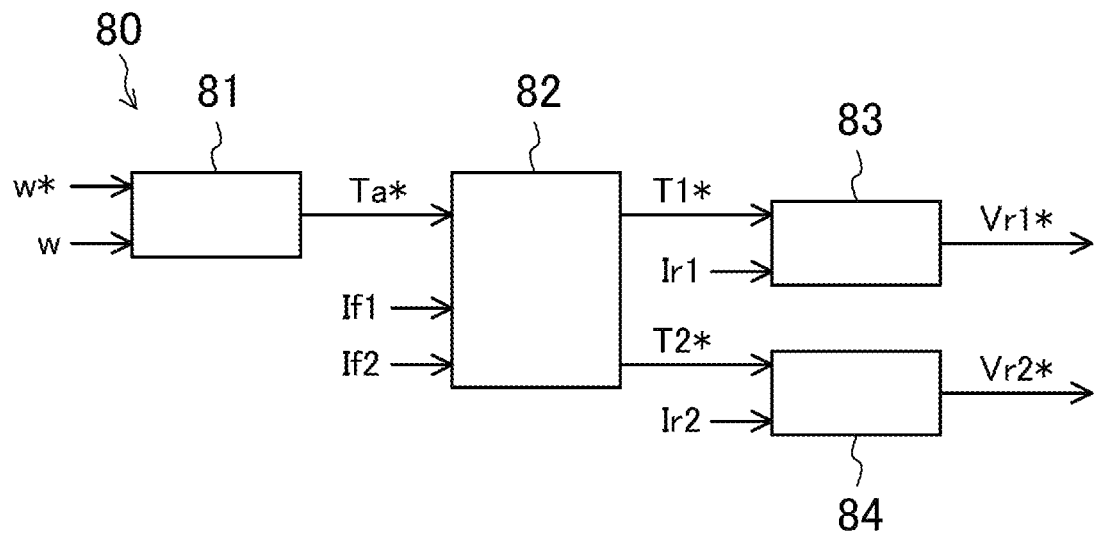
FIG. 5 is a block diagram illustrating an example of a configuration of a control unit according to the first embodiment.

As illustrated in FIG. 5, the control unit (80) includes a speed controller (81), a torque distribution controller (82), and first and second torque controllers (83, 84). Although illustration and description are omitted, the control unit (80) also includes a control system configured to output the first and second levitation voltage command values (Vf1*, Vf2*) for controlling supporting forces of the respective bearingless motors (60, 70).

The speed controller (81) receives a speed command value (w*) and a speed detected value (w), and outputs, based on a deviation therebetween, an overall torque command (Ta*). The overall torque command (Ta*) output by the speed controller (81) is input to the torque distribution controller (82). The speed detected value (w) may be detected by a rotational speed sensor (not illustrated) or may be estimated from the first and second rotation current detected values (Ir1, Ir2) or the like.

The torque distribution controller (82) receives the overall torque command (Ta*) (or the overall torque command (Ta*) and the first and second levitation current detected values (If1, If2)), and outputs a first torque command (T1*) for the first bearingless motor (60) and a second torque command (T2*) for the second bearingless motor (70). The sum of the first torque command (T1*) and the second torque command (T2*) is equivalent to a required torque of the entire electric motor system (2).

Figure 6:
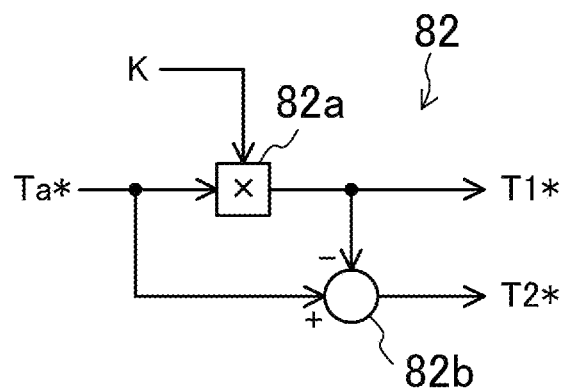
FIG. 6 is a block diagram illustrating an example of a configuration of a torque distribution controller according to the first embodiment.

Specifically, the torque distribution controller (82) includes a multiplier (82a) and a subtractor (82b) as illustrated in FIG. 6. The multiplier (82a) outputs a value obtained by multiplying the overall torque command (Ta*) input thereto by a torque distribution ratio (K) for the overall torque command (Ta*). The output of the multiplier (82a) is output from the torque distribution controller (82) as the first torque command (T1*). The subtractor (82b) outputs a value obtained by subtracting the output of the multiplier (82a) from the overall torque command (Ta*). The output of the subtractor (82b) is output from the torque distribution controller (82) as the second torque command (T2*).

The first torque controller (83) receives the first torque command (T1*) and the first rotation current detected value (Ir1), and outputs the first rotation voltage command value (Vr1*). The first rotation voltage command value (Vr1*) output by the first torque controller (83) is input to the first rotation inverter (91).

The second torque controller (84) receives the second torque command (T2*) and the second rotation current detected value (Ir2), and outputs the second rotation voltage command value (Vr2*). The second rotation voltage command value (Vr2*) output by the second torque controller (84) is input to the second rotation inverter (92).

Rotation Inverters

The first rotation inverter (91) receives the first rotation voltage command value (Vr1*) from the control unit (80), and supplies a voltage for rotation to the first bearingless motor (60). The second rotation inverter (92) receives the second rotation voltage command value (Vr2*) from the control unit (80), and supplies a voltage for rotation to the second bearingless motor (70). The first rotation inverter (91) constitutes a first inverter. The second rotation inverter (92) constitutes a second inverter.

Levitation Inverters

The first levitation inverter (93) receives the first levitation voltage command value (Vf1*) from the control unit (80), and supplies a voltage for levitation to the first bearingless motor (60). The second levitation inverter (94) receives the second levitation voltage command value (Vf2*) from the control unit (80), and supplies a voltage for levitation to the second bearingless motor (70).

Methods for Determining Torque Distribution Ratio

Methods (first to fifth determining methods) for determining the torque distribution ratio (K) performed by the control unit (80) (specifically, the torque distribution controller (82)) will be described. By changing the torque distribution ratio (K) based on the first to fifth determining methods, the control unit (80) can change the torque ratio. In the present embodiment, the torque distribution ratio (K) is set in a range of 0 to 1. By setting the torque distribution ratio (K) in this range, a situation is prevented in which one of the first and second bearingless motors (60, 70) performs a powering operation and the other one performs a regeneration operation, and the occurrence of an unnecessary loss can be avoided. When the torque distribution ratio (K) is set in this range, both the first and second bearingless motors (60, 70) perform a powering operation or a regeneration operation, or one of the first and second bearingless motors (60, 70) performs a powering operation or a regeneration operation and the other one does not generate any torque.

First Determining Method

The first determining method is a method for causing a more efficient one of the bearingless motors (60, 70) to output more torque depending on a rotational speed range.

The first bearingless motor (60) is more efficient than the second bearingless motor (70) in a relatively low rotational speed range. The first bearingless motor (60) and the first rotation inverter (91) are more efficient than the second bearingless motor (70) and the second rotation inverter (92) in the relatively low rotational speed range. On the other hand, the second bearingless motor (70) is more efficient than the first bearingless motor (60) in a relatively high rotational speed range. The second bearingless motor (70) and the second rotation inverter (92) are more efficient than the first bearingless motor (60) and the first rotation inverter (91) in the relatively high rotational speed range.

In the first determining method, the control unit (80) sets the torque distribution ratio (K) to 1 when the required torque can be output by the first bearingless motor (60) alone in the case where the electric motor system (2) operates in the relatively low rotational speed range. That is, in such a case, the control unit (80) causes the first bearingless motor (60) to output the torque but causes the second bearingless motor (70) not to output the torque. At this time, the control unit (80) may further perform a partial suspension operation for suspending a power conversion operation (or a switching operation) of the second rotation inverter (92).

The control unit (80) decreases the torque distribution ratio (K) as the required torque increases when the required torque cannot be output by the first bearingless motor (60) alone in the case where the electric motor system (2) operates in the relatively low rotational speed range. That is, in such a case, the control unit (80) causes the first bearingless motor (60) to output substantially the maximum torque and causes the second bearingless motor (70) to output the deficient torque with respect to the required torque of the electric motor system (2).

In the first determining method, the control unit (80) sets the torque distribution ratio (K) to 0 when the required torque can be output by the second bearingless motor (70) alone in the case where the electric motor system (2) operates in the relatively high rotational speed range. That is, in such a case, the control unit (80) causes the second bearingless motor (70) to output the torque but causes the first bearingless motor (60) not to output the torque. At this time, the control unit (80) may further perform the partial suspension operation for suspending a power conversion operation (or a switching operation) of the first rotation inverter (91).

The control unit (80) increases the torque distribution ratio (K) as the required torque increases when the required torque cannot be output by the second bearingless motor (70) alone in the case where the electric motor system (2) operates in the relatively high rotational speed range. That is, in such a case, the control unit (80) causes the second bearingless motor (70) to output substantially the maximum torque and causes the first bearingless motor (60) to output the deficient torque with respect to the required torque of the electric motor system (2).

Second Determining Method

The second determining method is a method for suppressing interference of a torque current with a supporting force depending on a bearing load of each of the bearingless motors (60, 70).

In the second determining method, the control unit (80) changes the torque ratio, based on a first index value indicating a bearing load of the first bearingless motor (60) and a second index value indicating a bearing load of the second bearingless motor (70).

The first index value is a ratio of a supporting current of the first bearingless motor (60) at a second reference time to a supporting current of the first bearingless motor (60) at a first reference time. The second index value is a ratio of a supporting current of the second bearingless motor (70) at the second reference time to a supporting current of the second bearingless motor (70) at the first reference time.

The first reference time may be, for example, a time point when the stationary drive shaft (30) is supported by the electric motor system (2) in a non-contact manner, a time point when the drive shaft (30) rotating at constant speed is supported by the electric motor system (2) in a non-contact manner, or any past time point updated periodically. The second reference time is any time point after the first reference time.

The first index value greater than 1 means that the supporting current of the first bearingless motor (60) has increased in a period from the first reference time to the second reference time. The first index value increases as a rate of increase in the supporting current in the period from the first reference time to the second reference time increases. The first index value less than 1 means that the supporting current of the first bearingless motor (60) has decreased in the period from the first reference time to the second reference time. The first index value decreases as a rate of decrease in the supporting current in the period from the first reference time to the second reference time increases. The description in this paragraph also applies to a relationship between the second index value and the supporting current of the second bearingless motor (70).

In the second determining method, if the first index value is greater than the second index value, the control unit (80) sets the torque distribution ratio (K) smaller after the second reference time (for example, immediately after the second reference time) than the torque distribution ratio (K) at the first reference time. That is, if the rate of increase in the supporting current of the first bearingless motor (60) is greater than the rate of increase in the supporting current of the second bearingless motor (70), the control unit (80) sets a ratio of the output torque of the first bearingless motor (60) to the output torque of the second bearingless motor (70) lower after the second reference time than the ratio at the first reference time.

In the second determining method, if the second index value is greater than the first index value, the control unit (80) sets the torque distribution ratio (K) larger after the second reference time than the torque distribution ratio (K) at the first reference time. That is, if the rate of increase in the supporting current of the second bearingless motor (70) is greater than the rate of increase in the supporting current of the first bearingless motor (60), the control unit (80) sets a ratio of the output torque of the second bearingless motor (70) to the output torque of the first bearingless motor (60) lower after the second reference time than the ratio at the first reference time.

Third Determining Method

The third determining method is a method for increasing, by using the torque current, the supporting force depending on the bearing load of each of the bearingless motors (60, 70).

In the third determining method, the control unit (80) changes the torque ratio, based on a first index value indicating a bearing load of the first bearingless motor (60) and a second index value indicating a bearing load of the second bearingless motor (70). The first index value and the second index value are the same as those used in the second determining method described above.

In the third determining method, if the first index value is greater than the second index value, the control unit (80) sets the torque distribution ratio (K) larger after the second reference time (for example, immediately after the second reference time) than the torque distribution ratio (K) at the first reference time. That is, if the rate of increase in the supporting current of the first bearingless motor (60) is greater than the rate of increase in the supporting current of the second bearingless motor (70), the control unit (80) sets a ratio of the output torque of the first bearingless motor (60) to the output torque of the second bearingless motor (70) higher after the second reference time than the ratio at the first reference time.

In the third determining method, if the second index value is greater than the first index value, the control unit (80) sets the torque distribution ratio (K) smaller after the second reference time than the torque distribution ratio (K) at the first reference time. That is, if the rate of increase in the supporting current of the second bearingless motor (70) is greater than the rate of increase in the supporting current of the first bearingless motor (60), the control unit (80) sets a ratio of the output torque of the second bearingless motor (70) to the output torque of the first bearingless motor (60) higher after the second reference time than the ratio at the first reference time.

Fourth Determining Method

The fourth determining method is a method for determining the torque distribution ratio (K) simply based on table data.

The control unit (80) includes table data for which the overall torque command (Ta*) and the speed detected value (w) (or the speed command value (w*)) serve as inputs and the torque distribution ratio (K) serves as an output. Alternatively, the control unit (80) includes table data for which the overall torque command (Ta*), the speed detected value (w) (or the speed command value (w*)), and the first and second levitation current detected values (If1, If2) serve as inputs and the torque distribution ratio (K) serves as an output.

In the fourth determining method, the overall torque command (Ta*) and the speed detected value (w) (or the speed command value (w*)), or the overall torque command (Ta*), the speed detected value (w) (or the speed command value (w*)), and the first and second levitation current detected values (If1, If2) are input to the control unit (80). The control unit (80) determines the torque distribution ratio (K), based on the individual inputs and the table data.

Fifth Determining Method

The fifth determining method is a method for determining, based on a plurality of pieces of three-dimensional table data, the torque distribution ratio (K) with which the power consumption of the electric motor system (2) can be suppressed.

The control unit (80) includes, for each of the first and second bearingless motors (60, 70), three-dimensional table data in which the x axis denotes the speed detected value (w) (or the speed command value (w*)), the y axis denotes the overall torque command (Ta*), and the z axis denotes the power consumption.

In the fifth determining method, the overall torque command (Ta*) and the speed detected value (w) (or the speed command value (w*)) are input to the control unit (80). Based on the individual inputs and the pieces of three-dimensional table data, the control unit (80) determines the torque distribution ratio (K) with which the power consumption of the electric motor system (2) is minimized.

Figure 7:
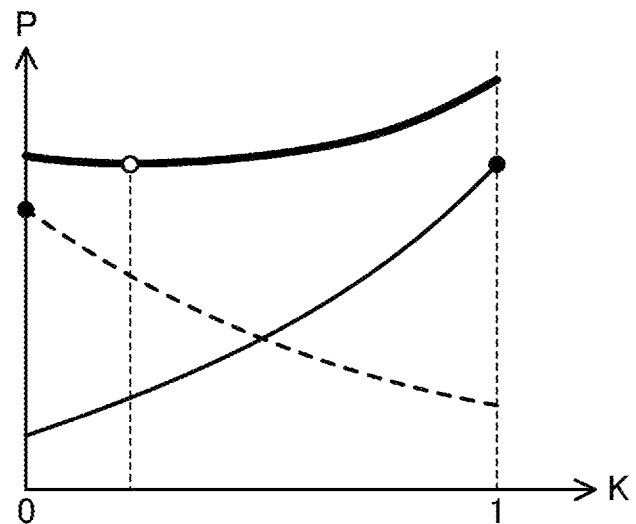
FIG. 7 is a graph for describing a method for determining a torque distribution ratio in the first embodiment.

A specific process of the fifth determining method will be described with reference to FIG. 7. FIG. 7 is a graph in which the horizontal axis denotes the torque distribution ratio (K) and the vertical axis denotes the power consumption of the electric motor system (2) in a state in which the electric motor system (2) is operating at a predetermined rotational speed. In FIG. 7, a thin solid line represents the power consumption of the first bearingless motor (60) and the first rotation inverter (91), a thin dashed line denotes the power consumption of the second bearingless motor (70) and the second rotation inverter (92), and a thick solid line denotes the sum of the power consumptions (that is, the power consumption of the electric motor system (2)). In FIG. 7, a black dot corresponding to the torque distribution ratio (K) of 0 indicates the power consumption of the electric motor system (2) when the power conversion operation of the first rotation inverter (91) is stopped. A black dot corresponding to the torque distribution ratio (K) of 1 indicates the power consumption of the electric motor system (2) when the power conversion operation of the second rotation inverter (92) is stopped.

In the fifth determining method, when the power conversion operations of the first and second rotation inverters (91, 92) are not stopped, the control unit (80) selects the torque distribution ratio (K) (indicated by a white dot in FIG. 7) with which the power consumption of the electric motor system (2) denoted by the thick solid line in FIG. 7 is minimized. When the power conversion operations of the first and second rotation inverters (91, 92) are not stopped, a delay in control response to a change in the overall torque command (Ta*) can be suppressed.

In the fifth determining method, when the power conversion operation of the first or second rotation inverter (91, 92) may be stopped, the control unit (80) selects the torque distribution ratio (K) (0 in the example in FIG. 7) with which the power consumption of the electric motor system (2) denoted by the thick solid line or each black dot in FIG. 7 is minimized. When the power conversion operation of the first or second rotation inverter (91, 92) is stopped, the power consumption of the electric motor system (2) can be reduced.

For example, in selecting the torque distribution ratio (K) in each of the determining methods described above, a search method such as hill climbing may be used or machine learning such as Q-learning, regression analysis, time-series analysis, a decision tree, a support vector machine, a neural network, or ensemble learning may be used.

Advantages of First Embodiment

The electric motor system (2) according to the present embodiment includes the drive shaft (30) rotatable around an axis; the first bearingless motor (60) and the second bearingless motor (70) each configured to rotate the drive shaft (30); the first rotation inverter (91) configured to supply power for generating a torque to the first bearingless motor (60); a second rotation inverter (92) configured to supply power for generating a torque to the second bearingless motor (70); and the control unit (80) configured to control the first rotation inverter (91) and the second rotation inverter (92) and to be able to change a ratio between an output torque of the first bearingless motor (60) and an output torque of the second bearingless motor (70). Thus, the first bearingless motor (60) outputs a torque based on the power supplied from the first rotation inverter (91). The second bearingless motor (70) outputs a torque based on the power supplied from the second rotation inverter (92). The control unit (80) can change the ratio (also referred to as a "torque ratio".) between the output torque of the first bearingless motor (60) and the output torque of the second bearingless motor (70). Consequently, by setting the torque ratio depending on various operation conditions or by setting the torque ratio in accordance with characteristics of the first bearingless motor (60) and the second bearingless motor (70), the power consumption of the entire electric motor system (2) can be suppressed.

In the electric motor system (2) according to the present embodiment, the control unit (80) performs a partial suspension operation for suspending a power conversion operation of the first rotation inverter (91) or the second rotation inverter (92). Thus, the power consumption of the first rotation inverter (91) or the second rotation inverter (92) that stops the power conversion operation in the partial suspension operation is reduced. Consequently, the power consumption of the electric motor system (2) can be further suppressed.

In the electric motor system (2) according to the present embodiment, the first bearingless motor (60) is more efficient than the second bearingless motor (70) in a relatively low rotational speed range, the second bearingless motor (70) is more efficient than the first bearingless motor (60) in a relatively high rotational speed range, and the control unit (80) sets the ratio of the output torque of the first bearingless motor (60) to the output torque of the second bearingless motor (70) higher in the relatively low rotational speed range than in the relatively high rotational speed range. Thus, in each of the relatively low rotational speed range and the relatively high rotational speed range, the ratio of the output torque of a more efficient one of the first bearingless motor (60) and the second bearingless motor (70) is set higher. Consequently, the output torque of the entire electric motor system (2) can be obtained at high efficiency over a wide speed range, and the power consumption of the electric motor system (2) can be further suppressed.

In the electric motor system (2) according to the present embodiment, the first bearingless motor (60) and the first rotation inverter (91) are more efficient than the second bearingless motor (70) and the second rotation inverter (92) in a relatively low rotational speed range, the second bearingless motor (70) and the second rotation inverter (92) are more efficient than the first bearingless motor (60) and the first rotation inverter (91) in a relatively high rotational speed range, and the control unit (80) sets the ratio of the output torque of the first bearingless motor (60) and the first rotation inverter (91) to the output torque of the second bearingless motor (70) and the second rotation inverter (92) higher in the relatively low rotational speed range than in the relatively high rotational speed range. Thus, in each of the relatively low rotational speed range and the relatively high rotational speed range, the ratio of the output torque of a more efficient combination among the combination of the first rotation inverter (91) and the first bearingless motor (60) and the combination of the second bearingless motor (70) and the second rotation inverter (92) is set higher. Consequently, the output torque of the entire electric motor system (2) can be obtained at high efficiency over a wide speed range, and the power consumption of the electric motor system (2) can be further suppressed.

In the electric motor system (2) according to the present embodiment, the control unit (80) is configured to be able to change the ratio between the output torque of the first bearingless motor (60) and the output torque of the second bearingless motor (70), based on a first index value indicating a bearing load of the first bearingless motor (60) and a second index value indicating a bearing load of the second bearingless motor (70). Thus, the ratio between the output torque of the first bearingless motor (60) and the output torque of the second bearingless motor (70) can be changed in accordance with the bearing load of the first bearingless motor (60) and the bearing load of the second bearingless motor (70).

In the electric motor system (2) according to the present embodiment, the first index value is a ratio of a current flowing through the supporting coils (67a to 67c) of the first bearingless motor (60) at a second reference time after a first reference time to a current flowing through the supporting coils (67a to 67c) of the first bearingless motor (60) at the first reference time, the second index value is a ratio of a current flowing through the supporting coils (77a to 77c) of the second bearingless motor (70) at the second reference time to a current flowing through the supporting coils (77a to 77c) of the second bearingless motor (70) at the first reference time, and the control unit (80) sets, in a case where the first index value is greater than the second index value, the ratio of the output torque of the first bearingless motor (60) to the output torque of the second bearingless motor (70) lower after the second reference time than the ratio at the first reference time, and sets, in a case where the second index value is greater than the first index value, the ratio of the output torque of the second bearingless motor (70) to the output torque of the first bearingless motor (60) lower after the second reference time than the ratio at the first reference time. Thus, the ratio of the output torque for a bearingless motor having a greater rate of increase in current (also referred to as "supporting current".) flowing through the supporting coils (67a to 67c, 77a to 77c) in a period from the first reference time to the second reference time among the first bearingless motor (60) and the second bearingless motor (70) is set lower after the second reference time. A current (also referred to as "torque current".) for outputting a torque in the first bearingless motor (60) and the second bearingless motor (70) may interfere with a supporting force. The interference of the torque current with the supporting force becomes marked as the supporting current increases. In the electric motor system (2) according to the present embodiment, by suppressing the torque current of a bearingless motor having a greater rate of increase in the supporting current among the first bearingless motor (60) and the second bearingless motor (70), the interference of the torque current with the supporting force is suppressed. Consequently, control of the electric motor system (2) can be improved.

In the electric motor system (2) according to the present embodiment, the first index value is a ratio of a current flowing through the supporting coils (67a to 67c) of the first bearingless motor (60) at a second reference time after a first reference time to a current flowing through the supporting coils (67a to 67c) of the first bearingless motor (60) at the first reference time, the second index value is a ratio of a current flowing through the supporting coils (77a to 77c) of the second bearingless motor (70) at the second reference time to a current flowing through the supporting coils (77a to 77c) of the second bearingless motor (70) at the second reference time, and the control unit (80) sets, in a case where the first index value is greater than the second index value, the ratio of the output torque of the first bearingless motor (60) to the output torque of the second bearingless motor (70) higher after the second reference time than the ratio at the first reference time, and sets, in a case where the second index value is greater than the first index value, the ratio of the output torque of the second bearingless motor (70) to the output torque of the first bearingless motor (60) higher after the second reference time than the ratio at the first reference time. Thus, the ratio of the output torque for a bearingless motor having a greater rate of increase in the supporting current in the period from the first reference time to the second reference time among the first bearingless motor (60) and the second bearingless motor (70) set higher after the second reference time. If the torque current increases in the first bearingless motor (60) and the second bearingless motor (70), the supporting force may increase. The increase in the supporting force based on the torque current becomes marked as the supporting current increases. In the electric motor system (2) according to the present embodiment, by increasing the torque current of a bearingless motor having a greater rate of increase in the supporting current among the first bearingless motor (60) and the second bearingless motor (70), the increase in the supporting force due to the torque current is promoted. Consequently, the supporting force of the electric motor system (2) can be efficiently increased.

Second Embodiment

A second embodiment will be described. An electric motor system (2) according to the present embodiment is different from that of the first embodiment described above in that a first bearingless motor (60) and a second bearingless motor (70) have characteristics identical to each other. Differences from the first embodiment described above will be mainly described below.

The first bearingless motor (60) and the second bearingless motor (70) have configurations identical to the configuration of the first bearingless motor (60), illustrated in FIG. 2, of the first embodiment described above. Methods (sixth and seventh determining methods) for determining a torque distribution ratio (K) in this case will be described.
Sixth Determining Method The sixth determining method is a method for changing the number of bearingless motors (60, 70) to be driven, in accordance with the overall torque command (Ta*).

Figure 8:
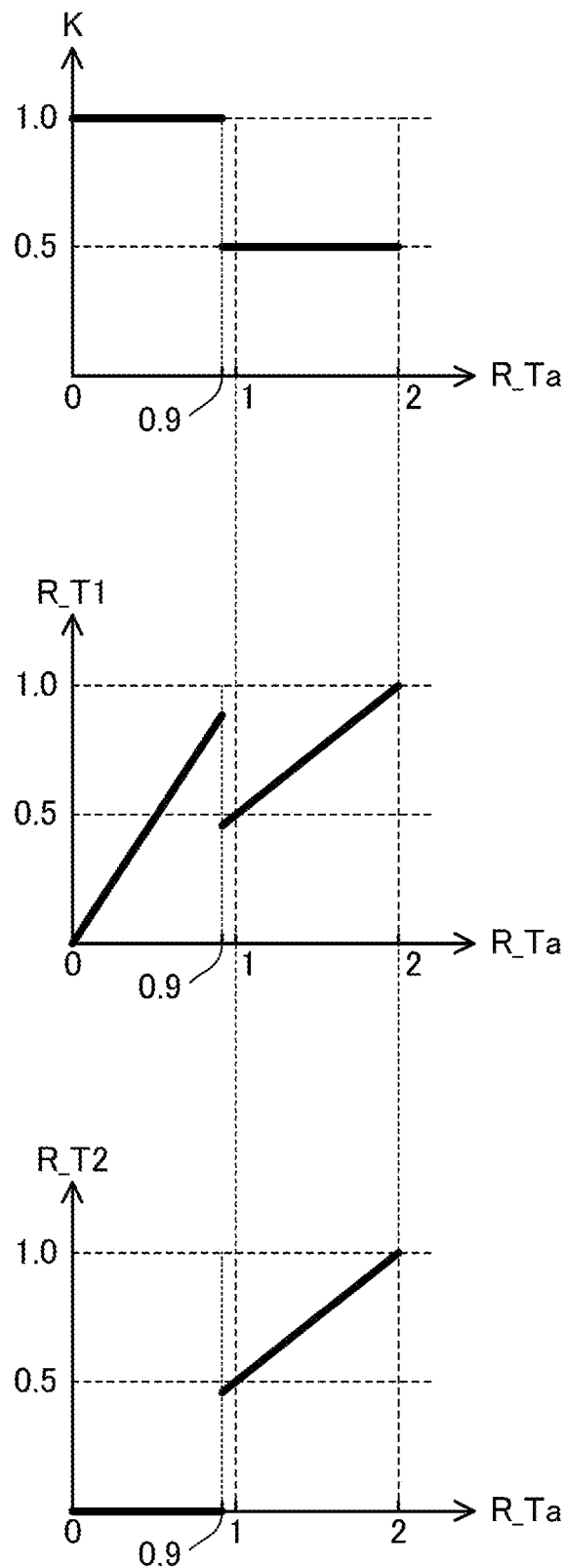
FIG. 8 depicts graphs for describing a method for determining a torque distribution ratio in a second embodiment.

An upper portion of FIG. 8 presents a graph in which the horizontal axis denotes a ratio (hereinafter, also referred to as "overall torque command ratio (R_Ta)".) of the overall torque command (Ta*) to a torque that can be output by the first or second rotation inverter (91, 92) and the vertical axis denotes the torque distribution ratio (K). A middle portion of FIG. 8 presents a graph in which the horizontal axis denotes the overall torque command ratio (R_Ta) and the vertical axis denotes a ratio (hereinafter, also referred to as "first torque command ratio (R_T1)".) of a first torque command (T1*) to the torque that can be output by the first or second rotation inverter (91, 92). A lower portion of FIG. 8 presents a graph in which the horizontal axis denotes the overall torque command ratio (R_Ta) and the vertical axis denotes a ratio (hereinafter, also referred to as "second torque command ratio (R_T2)".) of a second torque command (T2*) to the torque that can be output by the first or second rotation inverter (91, 92).

As illustrated in the upper portion of FIG. 8, in the sixth determining method, the control unit (80) sets the torque distribution ratio (K) to 1 in a range of the overall torque command ratio (R_Ta) of 0 to 0.9. As illustrated in the middle portion of FIG. 8, the first torque command ratio (R_T1) is proportional to the overall torque command ratio (R_Ta) in this range. On the other hand, the second torque command ratio (R_T2) is equal to 0 and is constant in this range. That is, in this range, the control unit (80) causes the first bearingless motor (60) alone to output the required torque of the electric motor system (2).

Note that 0.9 is an example of the number-of-bearingless-motors change threshold (Th). The number-of-bearingless-motors change threshold (Th) is a threshold used when the control unit (80) increases the number of bearingless motors (60, 70) that output the torque if the overall torque command ratio (R_Ta) is greater than or equal to the number-of-bearingless-motors change threshold (Th). The number-of-bearingless-motors change threshold may be any value but is preferably 0.8 to 0.95.

As illustrated in the upper portion of FIG. 8, in the sixth determining method, the control unit (80) sets the torque distribution ratio (K) to 0.5 in a range of the overall torque command ratio (R_Ta) of 0.9 to 2. As illustrated in the middle portion and the lower portion of FIG. 8, the first torque command ratio (R_T1) and the second torque command ratio (R_T2) take the same value and are proportional to the overall torque command ratio (R_Ta) in this range. That is, in this range, the control unit (80) causes each of the first bearingless motor (60) and the second bearingless motor (70) to output substantially a half the required torque of the electric motor system (2).
Seventh Determining Method The seventh determining method is another method for changing the number of bearingless motors (60, 70) to be driven, in accordance with the overall torque command (Ta*).

Figure 9:
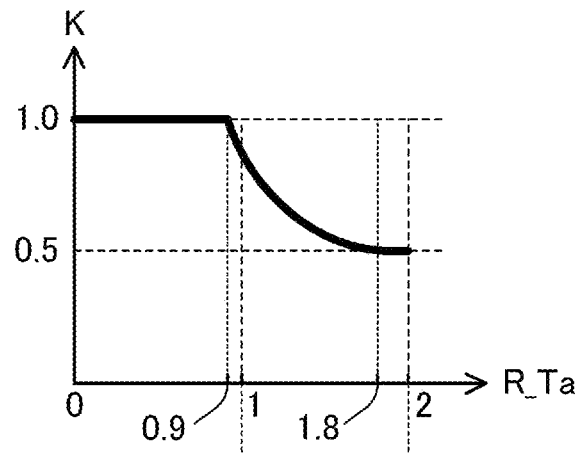
FIG. 9 depicts graphs for describing another method for determining a torque distribution ratio in the second embodiment.
Figure 9:
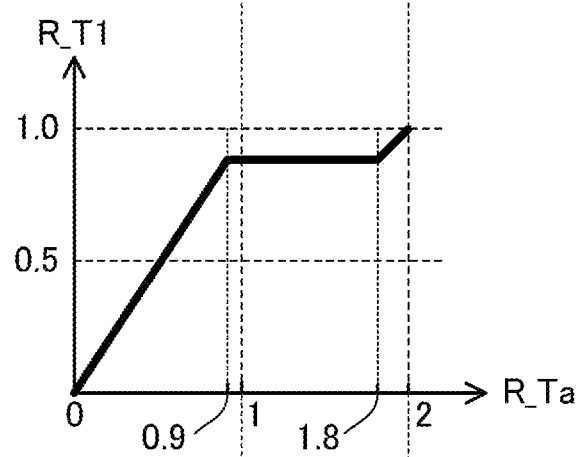
Figure 9:
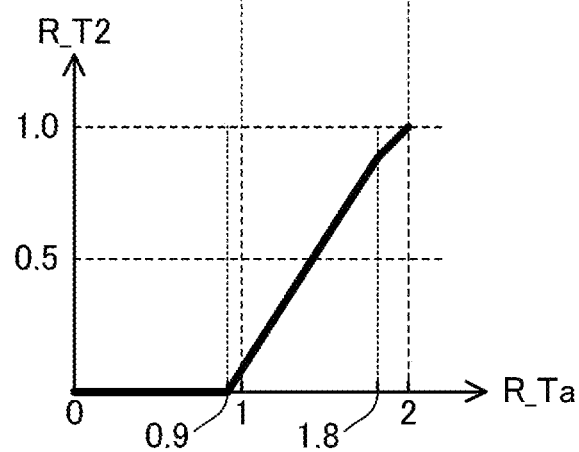

An upper portion of FIG. 9 presents a graph in which the horizontal axis denotes the overall torque command ratio (R_Ta) and the vertical axis denotes the torque distribution ratio (K). A middle portion of FIG. 9 presents a graph in which the horizontal axis denotes the overall torque command ratio (R_Ta) and the vertical axis denotes the first torque command ratio (R_T1). A lower portion of FIG. 9 presents a graph in which the horizontal axis denotes the overall torque command ratio (R_Ta) and the vertical axis denotes the second torque command ratio (R_T2).

As illustrated in the upper portion of FIG. 9, in the seventh determining method, the control unit (80) sets the torque distribution ratio (K) to 1 in a range of the overall torque command ratio (R_Ta) of 0 to 0.9. As illustrated in the middle portion of FIG. 9, the first torque command ratio (R_T1) is proportional to the overall torque command ratio (R_Ta) in this range. On the other hand, the second torque command ratio (R_T2) is equal to 0 and is constant in this range. That is, in this range, the control unit (80) causes the first bearingless motor (60) alone to output the required torque of the electric motor system (2).

Note that 0.9 is an example of the number-of-bearingless-motors change threshold (Th). The number-of-bearingless-motors change threshold may be any value but is preferably 0.8 to 0.95.

As illustrated in the upper portion of FIG. 9, in the seventh determining method, the control unit (80) reduces the torque distribution ratio (K) from 1 to 0.5 in a range of the overall torque command ratio (R_Ta) of 0.9 to 1.8. As illustrated in the middle portion of FIG. 9, the first torque command ratio (R_T1) is equal to 0.9 and is constant in this range. As illustrated in the lower portion of FIG. 9, the second torque command ratio (R_T2) is proportional to the overall torque command ratio (R_Ta) in this range. That is, in this range, the control unit (80) causes the second bearingless motor (70) to output a deficiency of the output torque of the first bearingless motor (60) with respect to the required torque of the electric motor system (2).

As illustrated in the upper portion of FIG. 9, in the seventh determining method, the control unit (80) sets the torque distribution ratio (K) to 0.5 in a range of the overall torque command ratio (R_Ta) of 1.8 to 2. As illustrated in the middle portion and the lower portion of FIG. 9, the first torque command ratio (R_T1) and the second torque command ratio (R_T2) take the same value and are proportional to the overall torque command ratio (R_Ta) in this range. That is, in this range, the control unit (80) causes each of the first bearingless motor (60) and the second bearingless motor (70) to output substantially a half the required torque of the electric motor system (2).

Advantages of Second Embodiment

The electric motor system (2) according to the present embodiment can also provide advantages similar to those of the first embodiment described above.

In the electric motor system (2) according to the present embodiment, the control unit (80) causes the first bearingless motor (60) or the second bearingless motor (70) alone to output the torque in the case where the overall torque command ratio (R_Ta) is less than or equal to a predetermined number-of-bearingless-motors change threshold (Th) that is less than 1. On the other hand, the control unit (80) causes the first bearingless motor (60) and the second bearingless motor (70) to output the torque in the case where the overall torque command ratio (R_Ta) is greater than the number-of-bearingless-motors change threshold (Th). If one of the first and second bearingless motors (60, 70) alone is caused to output the torque across the entire range in which the overall torque command ratio (R_Ta) is less than or equal to 1, the other of the first and second bearingless motors (60, 70) is required to be started when the overall torque command ratio (R_Ta) exceeds 1. Since this starting takes some time, the responsivity of the electric motor system (2) may decrease when the overall torque command ratio (R_Ta) exceeds 1. In contrast, in the present embodiment, the first or second bearingless motor (60, 70) that has not been started yet is started when the overall torque command ratio (R_Ta) exceeds the predetermined number-of-bearingless-motors change threshold (Th) that is less than 1. Even if this starting takes some time, an increase in required torque can be dealt with by the first or second bearingless motor (60, 70) that has already been started. Thus, the responsivity of the electric motor system (2) does not decrease and the responsivity of the electric motor system (2) can be increased also when the overall torque command ratio (R_Ta) exceeds 1.

Third Embodiment

A third embodiment will be described. An electric motor system (2) according to the present embodiment is different from that according to the first embodiment described above in a configuration of a torque distribution controller (82), etc. Differences from the first embodiment described above will be mainly described below.

Figure 10:
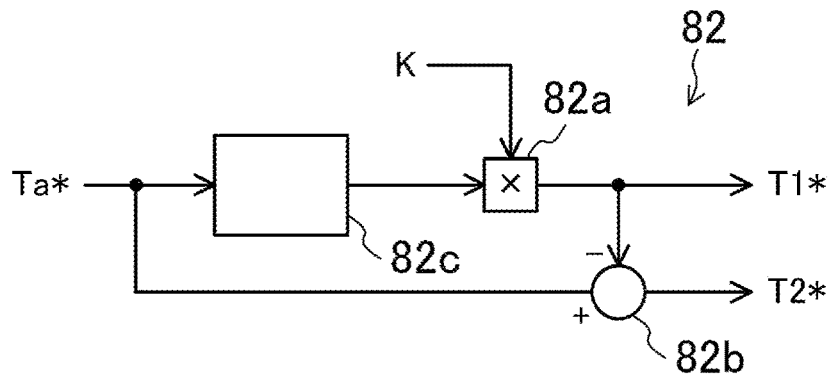
FIG. 10 is a block diagram illustrating an example of a configuration of a torque distribution controller according to a third embodiment.

As illustrated in FIG. 10, the torque distribution controller (82) includes a low-pass filter (82c). The low-pass filter (82c) is disposed between a node for the overall torque command (Ta*) and the multiplier (82a). Consequently, the first torque command (T1*) for the first bearingless motor (60) contains a low-frequency component (for example, a fundamental component of the overall torque command (Ta*) but does not contain substantially any high-frequency component (for example, a disturbance component), whereas the second torque command (T2*) for the second bearingless motor (70) contains the low-frequency component and the high-frequency component.

A carrier frequency of the first rotation inverter (91) and a carrier frequency of the second rotation inverter (92) are different from each other. Specifically, the carrier frequency of the first rotation inverter (91) is lower than the carrier frequency of the second rotation inverter (92). The carrier frequency of the first rotation inverter (91) is just required to be able to handle the low-frequency component. On the other hand, the carrier frequency of the second rotation inverter (92) is required to be able to handle the high-frequency component as well as the low-frequency component.

Advantages of Third Embodiment

The electric motor system (2) according to the present embodiment can also provide advantages similar to those of the first embodiment described above.

In the electric motor system (2) according to the present embodiment, the carrier frequency of the first rotation inverter (91) and the carrier frequency of the second rotation inverter (92) are different from each other. Thus, a rotation inverter having a higher carrier frequency among the first rotation inverter (91) and the second rotation inverter (92) can be assigned to control of the torque in the high-frequency range and the low-frequency range, and a rotation inverter having a lower carrier frequency among the first rotation inverter (91) and the second rotation inverter (92) can be assigned to control of the torque in the low frequency range. The torque can be controlled appropriately across a range from the low-frequency range to the high-frequency range, and the power consumption of the rotation inverter having the lower carrier frequency can also be suppressed. Thus, the power consumption of the electric motor system (2) can be further suppressed without reducing the functionality of the electric motor system (2).

Fourth Embodiment

A fourth embodiment will be described. An electric motor system (2) according to the present embodiment is different from that according to the third embodiment described above in a configuration of a torque distribution controller (82), etc. Differences from the third embodiment described above will be mainly described below.

Figure 11:
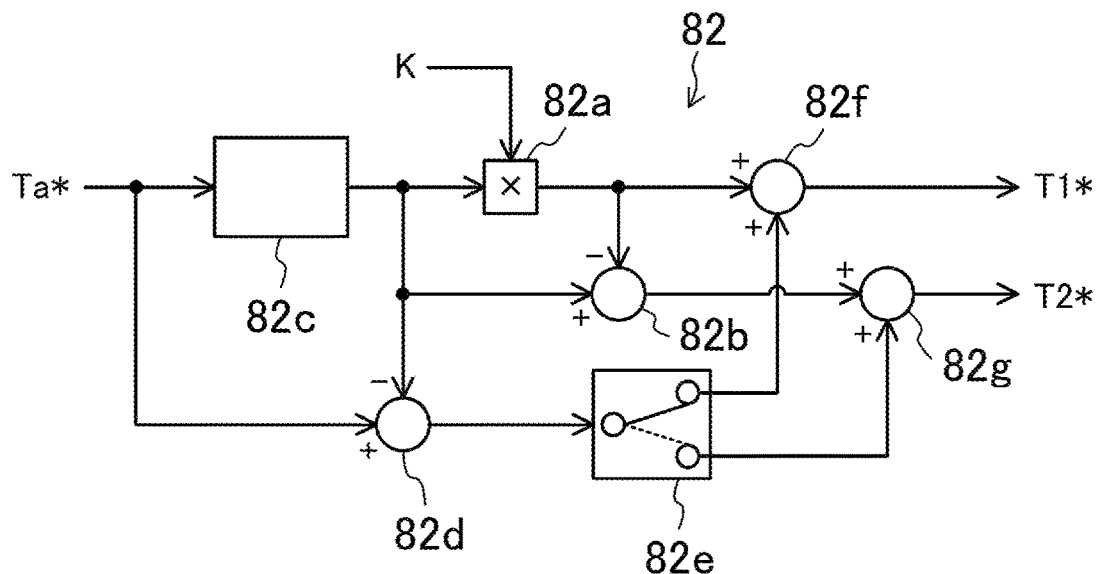
FIG. 11 is a block diagram illustrating an example of a configuration of a torque distribution controller according to a fourth embodiment.

As illustrated in FIG. 11, the torque distribution controller (82) includes a low-frequency component remover (82d), a selection switch (82e), a first high-frequency component adder (82f), and a second high-frequency component adder (82g).

The low-frequency component remover (82d) receives the overall torque command (Ta*) and an output of the low-pass filter (82c), and outputs a result obtained by subtracting the output of the low-pass filter (82c) from the overall torque command (Ta*). That is, the low-frequency component remover (82d) outputs a high-frequency component contained in the overall torque command (Ta*). For example, the low-frequency component remover (82d) is constituted by a subtractor.

The selection switch (82e) selects one of the first torque command (T1*) and the second torque command (T2*) to which the output of the low-frequency component remover (82d) (that is, the high-frequency component of the overall torque command (Ta*)) is to be added. The selection switch (82e) can switch the state between a first state (a state indicated by a solid line in FIG. 11) for adding the output of the low-frequency component remover (82d) to the first torque command (T1*) and a second state (a state indicated by a dashed line in FIG. 11) for adding the output of the low-frequency component remover (82d) to the second torque command (T2*).

The first high-frequency component adder (82f) includes the output of the low-frequency component remover (82d) in the first torque command (T1*) when the selection switch (82e) is in the first state. That is, the first torque command (T1*) contains the low-frequency component and the high-frequency component when the selection switch (82e) is in the first state. On the other hand, the first torque command (T1*) contains the low-frequency component but does not contain substantially any high-frequency component when the selection switch (82e) is in the second state.

The second high-frequency component adder (82g) includes the output of the low-frequency component remover (82d) in the second torque command (T2*) when the selection switch (82e) is in the second state. That is, the second torque command (T2*) contains the low-frequency component and the high-frequency component when the selection switch (82e) is in the second state. On the other hand, the second torque command (T2*) contains the low-frequency component but does not contain any high-frequency component when the selection switch (82e) is in the first state.

The control unit (80) may periodically switch the state of the selection switch (82e) between the first state and the second state. When setting the selection switch (82e) in the first state, the control unit (80) may set the carrier frequency of the first rotation inverter (91) higher than the carrier frequency of the second rotation inverter (92). When setting the selection switch (82e) in the second state, the control unit (80) may set the carrier frequency of the second rotation inverter (92) higher than the carrier frequency of the first rotation inverter (91). Consequently, a situation may be avoided in which one of the first and second rotation inverters (91, 92) alone keeps operating at a high carrier frequency. Thus, the life of the switching elements included in the first and second rotation inverters (91, 92) can be extended, and consequently the life of the electric motor system (2) can be extended.

Advantages of Fourth Embodiment

The electric motor system (2) according to the present embodiment can also provide advantages similar to those of the third embodiment described above.

In the electric motor system (2) according to the present embodiment, the control unit (80) is configured to be able to switch the electric motor system (2) between a state in which the carrier frequency of the first rotation inverter (91) is higher than the carrier frequency of the second rotation inverter (92) and a state in which the carrier frequency of the second rotation inverter (92) is higher than the carrier frequency of the first rotation inverter (91). Thus, the power consumption of a rotation inverter having a lower carrier frequency among the first and second rotation inverters (91, 92) can be suppressed, and consequently the power consumption of the electric motor system (2) can be suppressed.

Fifth Embodiment

A fifth embodiment will be described. An electric motor system (2) according to the present embodiment is different from that according to the first embodiment described above in that the control unit (80) does not include the torque distribution controller (82). Differences from the first embodiment described above will be mainly described below.

Figure 12:
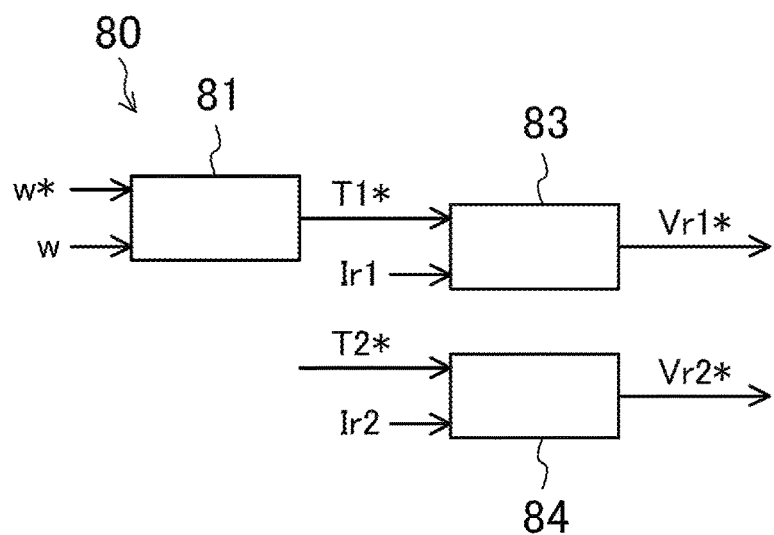
FIG. 12 is a block diagram illustrating an example of a configuration of a control unit according to a fifth embodiment.

As illustrated in FIG. 12, the control unit (80) is configured to generate, based on feedback control, the first torque command (T1*) and the first rotation voltage command value (Vr1*) corresponding to this, and generate, based on forward control, the second torque command (T2*) and the second rotation voltage command value (Vr2*) corresponding to this.

The second torque command (T2*) may be, for example, a fixed value, a value obtained from the speed detected value (w) (or the speed command value (w*)) by using predetermined table data, or a value obtained from the speed detected value (w) (or the speed command value (w*)) and a refrigerant pressure (for example, a difference between a discharge pressure and a suction pressure at the turbo compressor (1) or the discharge pressure at the turbo compressor (1)) by using another predetermined data table. Thus, the second torque command (T2*) contains a low-frequency component but does not contain substantially any high-frequency component.

The first torque command (T1*) is obtained based on speed feedback control so that an excess or a deficiency of the second torque command (T2*) with respect to the required torque of the electric motor system (2) is compensated for. Thus, the first torque command (T1*) contains not only a low-frequency component but also a high-frequency component.

As described above, to reduce the power consumption without reducing the functionality of the electric motor system (2), the carrier frequency of the second rotation inverter (92) is preferably set lower than the carrier frequency of the first rotation inverter (91).

Advantages of Fifth Embodiment

The electric motor system (2) according to the present embodiment can also provide advantages similar to those of the first embodiment described above.

In the electric motor system (2) according to the present embodiment, the control unit (80) generates, based on feedback control, the first torque command (T1*) for the first bearingless motor (60), and generates, based on forward control, the second torque command (T2*) for the second bearingless motor (70). Thus, the configuration of the control system can be simplified compared with those of the first to fourth embodiments described above, and the production cost of the electric motor system (2) can be reduced.

Other Embodiments

The embodiments described above may be configured as follows.

For example, the first electric motor and the second electric motor may be electric motors of any type other than the bearingless motors. For example, the first electric motor and the second electric motor may be electric motors of any one of the surface permanent magnet synchronous type, the interior permanent magnet synchronous type, and the synchronous reluctance type. The first electric motor and the second electric motor may be electric motors of the same type or electric motors of different types. The first electric motor and the second electric motor may have characteristics identical to each other or characteristics different from each other.

For example, each of the bearingless motors (60, 70) may be a bearingless motor of any type other than the surface permanent magnet type. For example, each of the bearingless motors (60, 70) may be a bearingless motor of the consequent pole type, the interior permanent magnet (IPM) type in which permanent magnets are embedded inside the rotor, the inset type, the buried permanent magnet (BPM) type, the forward salient pole type, or the synchronous reluctance type.

For example, the first and second index values serving as indices of the bearing loads of the respective bearingless motors (60, 70) may be, in place of or in addition to the supporting currents of the respective bearingless motors (60, 70), a displacement of the drive shaft (30) or a flow rate, a pressure, and a temperature of refrigerant flowing through the refrigerant circuit.

For example, the first air gap (AG1) of the first bearingless motor (60) may be larger than the second air gap (AG2) of the second bearingless motor (70).

For example, the number of electric motors included in the electric motor system (2) may be three or more. In the case where the number of electric motors is three or more, the control unit (80) preferably includes a single speed controller (81) in the entire electric motor system (2) and torque controllers for the respective electric motors. Including only a single speed controller (81) in the entire electric motor system (2) can implement stable control without a plurality of speed controllers interfering with one another. In the case where the number of electric motors is three or more and the control unit (80) includes the torque distribution controller, the torque distribution controller is preferably configured to receive the overall torque command (Ta*) and to output a torque command (Tn*) for each of the electric motors. Specifically, the torque distribution controller includes a multiplier that outputs a value obtained by multiplying the overall torque command (Ta*) input thereto by a torque distribution ratio (Kn) for each of the electric motors. The torque distribution ratios (Kn) for the respective electric motors are selected so that the sum is equal to 1.

For example, the first inverter (91) and the second inverter (92) may have characteristics identical to each other or characteristics different from each other.

While the embodiments and modifications have been described above, it should be understood that various modifications can be made on the configurations and details without departing from the gist and the scope of the claims. The embodiments and modifications described above may be combined or replaced as appropriate as long as the functionality of the target of the present disclosure is not reduced.

As described above, the present disclosure is useful for an electric motor system.

The invention claimed is:

1. An electric motor system comprising: a drive shaft rotatable around an axis; a first electric motor and a second electric motor each configured to rotate the drive shaft; a first inverter configured to supply power in order to generate a torque to the first electric motor; a second inverter configured to supply power in order to generate a torque to the second electric motor; and a control unit configured to control the first inverter and the second inverter, the controller being configured to be able to change a ratio between an output torque of the first electric motor and an output torque of the second electric motor, each of the first electric motor and the second electric motor having a rotor and a stator, the rotor of the first electric motor being separate from the rotor of the second electric motor, the stator of the first electric motor being separate from the stator of the second electric motor, one of the first and second electric motors being more efficient than an other of the first and second electric motors in a relatively low rotational speed range, and the other of the first and second electric motors being more efficient than the one of the first and second electric motors in a relatively high rotational speed range, and the control unit being configured to set the ratio, of the output torque of the one of the first and second electric motors to output torque of the other of the first and second electric motors, higher in the relatively low rotational speed range than in the relatively high rotational speed range.

2. The electric motor system according to claim 1, wherein
the control unit is configured to perform a partial suspension operation in order to suspend a power conversion operation of the first inverter or the second inverter.

3. The electric motor system according to claim 1, wherein
a carrier frequency of the first inverter and a carrier frequency of the second inverter are different from each other.

4. An electric motor system comprising:
a drive shaft rotatable around an axis;
a first electric motor and a second electric motor each configured to rotate the drive shaft;
a first inverter configured to supply power in order to generate a torque to the first electric motor;
a second inverter configured to supply power in order to generate a torque to the second electric motor; and
a control unit configured to control the first inverter and the second inverter, the controller being configured to be able to change a ratio between
an output torque of the first electric motor and
an output torque of the second electric motor,
each of the first electric motor and the second electric motor having a rotor and a stator,
the rotor of the first electric motor being separate from the rotor of the second electric motor,
the stator of the first electric motor being separate from the stator of the second electric motor,
one of a first combination of the first electric motor and the first inverter and a second combination of the second electric motor and the second inverter being more efficient than an other of the first and second combinations in a relatively low rotational speed range, and the other of the first and second combinations being more efficient than the one of the first and second combinations in a relatively high rotational speed range, and the control unit being configured to set a ratio, of an output torque of the one of the first and second combinations to an output torque of the other of the first and second combinations, higher in the relatively low rotational speed range than in the relatively high rotational speed range.

5. An electric motor system comprising:
a drive shaft rotatable around an axis;
a first electric motor and a second electric motor each configured to rotate the drive shaft;
a first inverter configured to supply power in order to generate a torque to the first electric motor;
a second inverter configured to supply power in order to generate a torque to the second electric motor; and
a control unit configured to control the first inverter and the second inverter, the controller being configured to be able to change a ratio between
an output torque of the first electric motor and
an output torque of the second electric motor,
each of the first electric motor and the second electric motor having a rotor and a stator,
the rotor of the first electric motor being separate from the rotor of the second electric motor,
the stator of the first electric motor being separate from the stator of the second electric motor,
the first electric motor and the second electric motor including bearingless motors, and
the control unit being configured to be able to change the ratio between the output torque of the first electric motor and the output torque of the second electric motor, based on a first index value indicating a bearing load of the first electric motor and a second index value indicating a bearing load of the second electric motor.

6. The electric motor system according to claim 5, wherein
the first index value is a ratio of
a current flowing through supporting coils of the first electric motor at a second reference time to
a current flowing through the supporting coils of the first electric motor at a first reference time,
the second reference time being after the first reference time,
the second index value is a ratio of
a current flowing through supporting coils of the second electric motor at the second reference time to
a current flowing through the supporting coils of the second electric motor at the first reference time, and
the control unit is configured to set
in a case in which the first index value is greater than the second index value, the ratio of the output torque of the first electric motor to the output torque of the second electric motor lower after the second reference time than the ratio at the first reference time, and
in a case in which the second index value is greater than the first index value, the ratio of the output torque of the second electric motor to the output torque of the first electric motor lower after the second reference time than the ratio at the first reference time.

7. The electric motor system according to claim 5, wherein
the first index value is a ratio of
a current flowing through supporting coils of the first electric motor at a second reference time to
a current flowing through the supporting coils of the first electric motor at a first reference time,
the second reference time being after the first reference time,
the second index value is a ratio of
a current flowing through supporting coils of the second electric motor a second reference time to
a current flowing through the supporting coils of the second electric motor at the first reference time, and
the control unit is configured to set
in a case in which the first index value is greater than the second index value, the ratio of the output torque of the first electric motor to the output torque of the second electric motor higher after the second reference time than the ratio at the first reference time, and
in a case in which the second index value is greater than the first index value, the ratio of the output torque of the second electric motor to the output torque of the first electric motor higher after the second reference time than the ratio at the first reference time.

* * * * *